United States Patent [19]

Suau

[11] 4,310,887
[45] Jan. 12, 1982

[54] VERIFICATION AND CALIBRATION OF WELL LOGS AND RECONSTRUCTION OF LOGS

[75] Inventor: Jean A. Suau, London, England

[73] Assignee: Schlumberger Technology Corporation, New York, N.Y.

[21] Appl. No.: 43,689

[22] Filed: May 30, 1979

Related U.S. Application Data

[63] Continuation of Ser. No. 284,135, Aug. 28, 1972.

[51] Int. Cl.³ .................................................. G06F 15/20
[52] U.S. Cl. ..................................... 364/422; 340/853
[58] Field of Search ................ 364/422; 340/853, 861; 73/152; 367/25

[56] References Cited

U.S. PATENT DOCUMENTS 3,721,960  3/1973  Tinch et al. ...................... 340/18 R Primary Examiner—Edward J. Wise
Attorney, Agent, or Firm—Cooper, Dunham, Clark, Griffin & Moran

[57] ABSTRACT

Disclosed is a machine implemented method of utilizing existing log data from one or more boreholes in a field to find out what zero shift, if any, may be necessary in order to calibrate a log from a borehole in the same field. In one embodiment, the disclosed system utilizes the three porosity logs (neutron, density and sonic) and builds a statistical model of the field by counting the number of occurrences of each combination of the three porosity log measurements and by storing the counts in a three-dimensional cell memory where the three dimensions correspond to the three porosity logs and each cell location is identified by a particular combination of the three porosity measurements. To calibrate a log from the same field, data sets comprising the three porosity measurements taken at different depth levels in the borehole from which that log is derived are used sequentially to address cells, the contents of the addressed cells are added to the current contents of a central accumulator, and the cells adjacent the addressed cell along the dimension corresponding to the log which is to be calibrated are added to the current contents of respective side accumulators. For example, ten side accumulators may be used, with five of them storing the cumulative counts respectively of the five adjacent cells preceding the addressed cell, and with the other five storing the cumulative contents respectively of the five cells after the addressed cell along the selected dimension. The contents of the central and the side accumulators are used to form a correction curve whose peak indicates what zero shift, if any, should be applied to the log which is to be recalibrated. If the curve peaks at the central accumulator, then there is no need for a zero shift. If the curve peaks elsewhere, a zero shift corresponding to the distance between the peak and the center accumulator is used for calibration purposes. For example, if the curve peaks at the side accumulator immediately adjacent the central accumulator and corresponding to the first cell preceding the addressed cell, the log is calibrated by subtracting from each of its measurements a number corresponding to the dimension difference between two immediately adjacent cell locations. Disclosed is also a method of utilizing a similar technique for the purpose of reconstructing a missing log. The disclosed methods are applicable to data sets containing more than three measurements. The data sets may comprise any suitable combination of measurements; it is preferable that the measurements comprising a data set have some inherent mutual interdependence.

14 Claims, 11 Drawing Figures

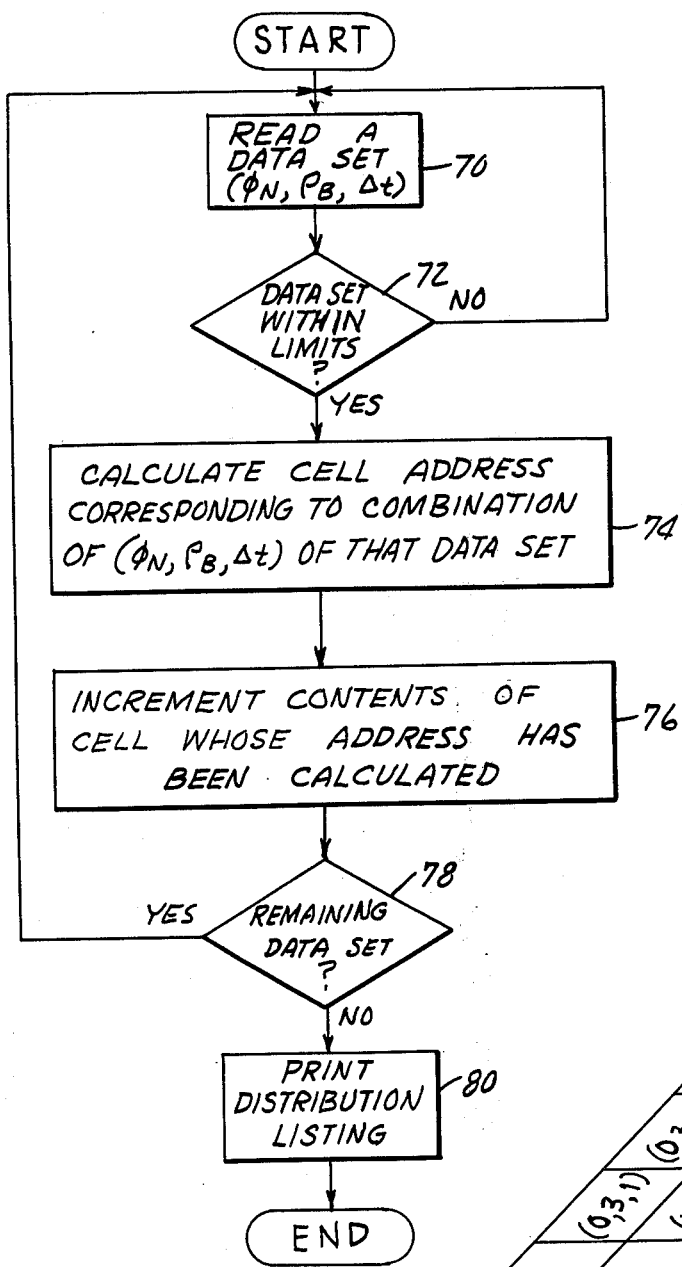
Fig. 2.
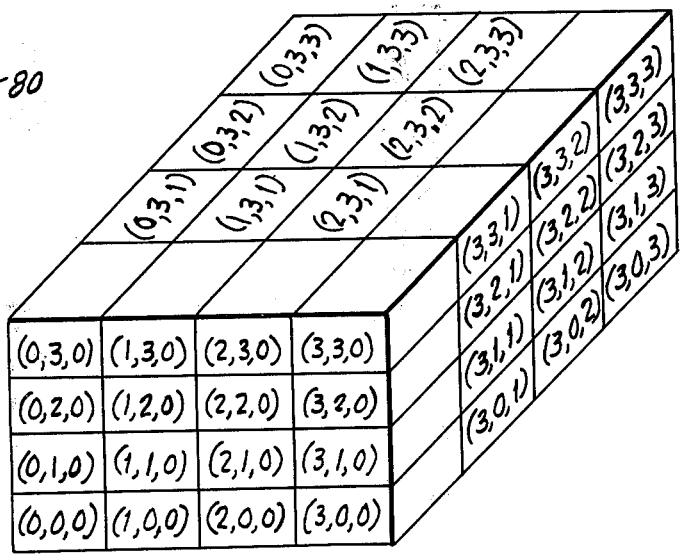
Fig. 3.
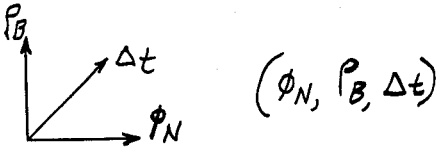

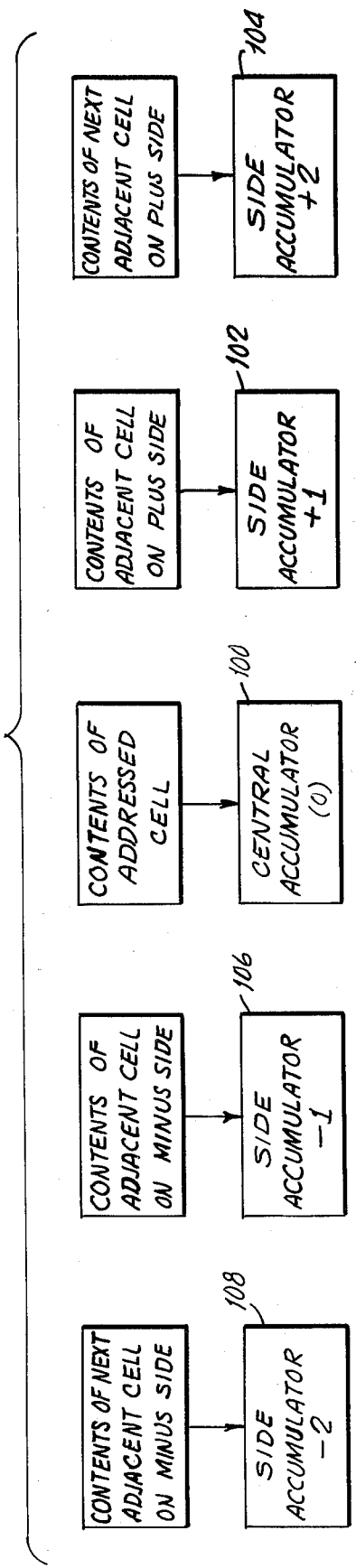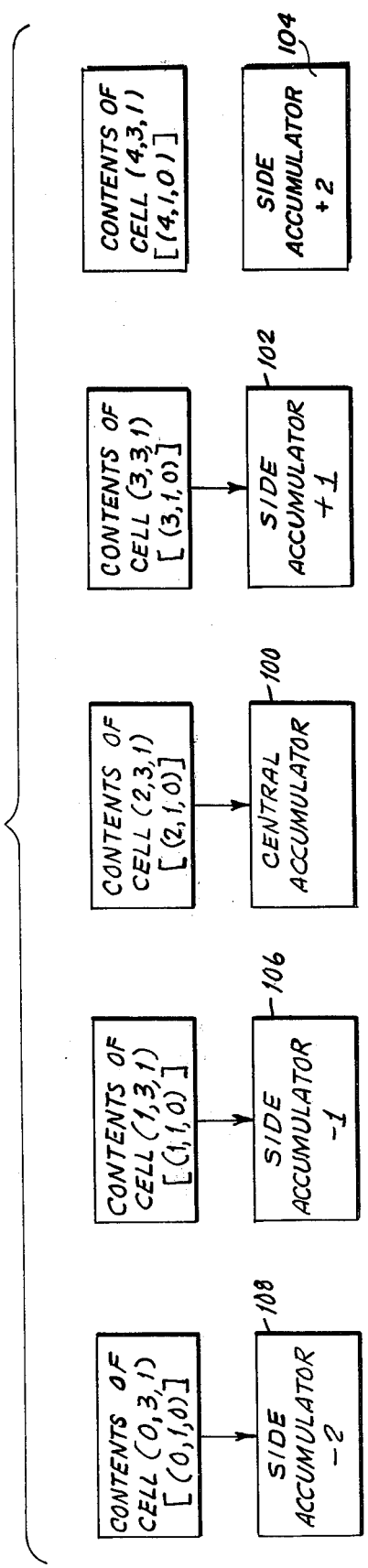

VERIFICATION AND CALIBRATION OF WELL LOGS AND RECONSTRUCTION OF LOGS

This is a continuation of application Ser. No. 284,135 filed Aug. 28, 1972.

BACKGROUND OF THE INVENTION

The invention relates to methods of investigating earth formations traversed by boreholes. More particularly, the invention relates to processing well logging data derived from apparatus lowered in a borehole for investigating subsurface earth formations. Still more particularly, the invention relates to verifying and calibrating logs and to reconstructing missing logs.

Boreholes are drilled into the earth in search of earth formations bearing fossil fuels in the form of coal or hydrocarbons, minerals such as sulfur and salt, and water which is pottable or contains valuable salts. A knowledge of formation characteristics is required to locate and evaluate such earth formations. Important characteristics are the lithology or mineral composition of the formations, the grain structure of the formations, the porosity or volume of pore space between the grains, the contents of these pore spaces, the permeability or capacity for fluid flow between the pore spaces, and the structure of the formation which determines its capacity to trap and accumulate significant amounts of deposits. In order to be of a value, a formation must have the correct combination of porosity, permiability, lithology, pore structure and pore contents. A general reference of formation characteristics and their evaluation is a book by E. J. Lynch entitled "Formation Evaluation" and published by Harper and Row in 1962.

An effective method of obtaining information about the characteristics of the earth formations penetrated by boreholes is by investigating apparatus especially adapted for the environment of a borehole. Such apparatus is lowered in the borehole on a wire line after the hole is drilled. This method is known as wireline logging, or more simply well logging. In well logging, the exploring apparatus is electrically and mechanically connected by means of the wire line to control and recording equipment located at the surface. The investigating apparatus is lowered in the borehole by means of a winch and is then withdrawn slowly while deriving measurements versus depth. These measurements are recorded on a strip of film or paper, with the long dimension of the strip scaled in depth, thus forming a log of the borehole measurement versus depth. Alternately, the measurements may be recorded in a suitable electronic memory. The exploring apparatus employed to make the measurements and to generate the electrical signals for recording of these measurements is generally of three types, defined by the method employed to make the measurements. The three types of exploring apparata are electrical, sonic and radiation apparata. A discussion of such well logging techniques may be found in a book by Hubert Guyod and Lemay Shane entitled "Geophysical Well Logging" and published in 1969 for Hubert Guyod, Houston, Tex. A discussion of log interpretation may be found in a book by S. J. Pirson, entitled "Handbook for Well Log Analysis" and published by Prentice-Hall in 1963.

Although general log accuracy is progressively improving with time, modern interpretation techniques create new and very stringent requirements for accuracy. This is particularly true of the porosity logs (neutron, density and sonic), but is also true of other logs (such as spontaneous potential logs, resistivity logs, resistivity micrologs, laterologs, electromagnetic logs, various radioactivity logs and logs such as dip, acoustic, geophone, geothermal, photoelectrical and geochemical logs). It may well be that complex log interpretation techniques, such as shale sands and lithology-porosity interpretation techniques require accuracy which is better than what can be reasonably expected from field recalibrations of measurement devices.

The importance and desirability of log calibration has been recognized in the past, and various techniques have been developed for calibration of logs. For example, manual calibration of logging systems by reference to standards is discussed in an article by Cochrane, J. E., entitled "Principles of Log Calibration and Their Application to Log Accuracy", and published in the Journal of Petroleum Technology in July 1966 at pages 81 through 826. The technique involves one-point, two-point, or multipoint surface calibration by means of reference signals. In particular, the investigating apparatus which is normally lowered into a borehole to take measurements is placed at the surface in an environment whose characteristics are known, and the difference between the expected and the actual signals generated by the apparatus are recorded at one or more points on its response curve. These differences are used to correct the actual measurements taken by the apparatus in a borehole. A similar technique is discussed in an article by Maciula, E. A. and Cochrane, J. E. entitled Quantitative Use of Calibration Data to Correct Miscalibrated Well Logs and published in the Journal of Petroleum Technology in July 1968 at pages 663–670. The technique involves the use of reference signals to determine the offset of a log from an accurate log, and uses this offset as an operator on recorded measurements to convert them to true values.

Another technique is discussed in Jeffries, F. S. and Kemp, E. M., Computer Reconciliation of Sonic Log and Core Analysis in the Boundary Lake Field, Fourth Annual Logging Symposium Transactions, May 23–24, 1963, Oklahoma City, Okla., pages IV-1 through IV-18. The technique involves calibration of sonic legs by reference to porosity data obtained from core analysis.

Another manual approach to calibration of logs is through statistical analysis of logs by a person skilled in log interpretation. This approach involves creating a model of a field, and deciding if a small shift of one or several of the logs from that field would cause them to conform better to the model. The model is the subjective belief of a person who is highly skilled in log interpretation as to what may be the lithology of a particular field. It may be created on the basis of manipulation of porosity readings, as discussed in Burk, J. A. et al., The Litho-Porosity Cross-Plot, SPWLA, Tenth Annual Logging Symposium, May 25–28, 1969, or on the basis of other information such as individual logs from boreholes in the field of interest, or other knowledge of that field. This manual approach requires a person who is highly skilled and highly experienced in interpreting logs (and geological data in general), and involves a high degree of subjectivity. The approach is time-consuming. Additionally, its extension to more than two or three logs is extremely difficult, and emphasizes the importance of the human factor which is necessarily involved in it. This is undesirable, because the use of a greater number of logs adds additional valuable information.

SUMMARY OF THE INVENTION

The invention relates generally to methods of investigating earth formations traversed by boreholes, and relates particularly to processing well logging data derived from apparatus lowered in a borehole for investigating subsurface earth formations. Specifically, the invention relates to verifying and calibrating logs and to reconstructing missing logs.

One aspect of the invention relates to creating a statistical model of a field by deriving, by means of a borehole investigating apparatus, a plurality of measurements each functionally related to a different earth formation characteristic, forming data sets each comprising a defined combination of said plurality of measurements, and combining the data sets in a defined manner to form a statistical model of the field traversed by the investigated boreholes.

Another aspect of the invention relates to verifying the calibration of and to calibrating logs derived from a borehole in the same field by deriving similar measurements from that borehole and forming similar data sets from these measurements. These new data sets are statistically combined in a defined manner with the statistical model of the field to determine what modifications of the last mentioned data sets may be desired in order to bring a log represented by these data sets into a defined statistical conformity with the model of the field.

Still another aspect of the invention relates to reconstructing a missing log by forming similar data sets for a borehole in the field, which data sets, however, do not include a representation of the missing log. Then, the last mentioned data sets are statistically combined in a defined manner with the model of the field to reconstruct thereby measurements representing the missing log.

In particular, the creation of a statistical model in a field involves investigating one or more boreholes in the field by borehole investigating apparatus to derive therefrom a plurality of measurements at each depth level. As a result of such investigation, there is, for each depth level, a plurality of measurements each of which is functionally related to a different characteristic of the earth formation adjoining the borehole at that depth level. For example, at each depth level, the plurality of measurements may include a neutron measurement, a bulk density measurement, and a sonic measurement. Data sets are then formed, with each data set comprising the measurements taken at a specific depth level. For example, a data set may comprise the neutron, bulk density and sonic measurements taken at a specific depth level. The data sets are statistically combined with each other to form a statistical model of the field. This includes forming a memory of cells which is functionally a three-dimensional cube of cells, with each dimension of the cube corresponding to one of the three measurements. Each cell of the cube is then uniquely associated with a particular combination of the three measurements, and each data set may be used to address a single cell. The data sets are examined to determine to which cell they correspond, and each cell is caused to store a count of the number of occurrence of the data set corresponding to it. After all data sets have been so examined, the cells in the three-dimensional cube of cells are storing counts, and the distribution of the stored counts is representative of a statistical model of the field. Prior to being used to address cells, the measurements forming the data sets may be preliminarily processed to improve their quality. Data sets which are obviously erroneous or are of dubious quality may be discarded in order to enhance the statistical conformity of the model to the field.

After the statistical model is created, a log represented by one of the measurements of data sets derived from a borehole in the same field may be calibrated (or—its calibration may be verified) by statistically combining the data sets containing the log to the model created as described above. Each of the last-mentioned data sets if used to address a cell in the same manner as when creating the statistical model. The contents of the addressed cell are added to the current contents of a central accumulator, and the contents of several adjacent cells along the dimension representing the log which is to be calibrated are added to the current contents of respective side accumulators. After all of the data sets containing a representation of the log which is to be calibrated are used in this manner, the central and side accumulators contain counts whose distribution is representative of the desired calibration correction. In particular, the offset from the central accumulator of the peak of the curve for the plot of accumulator number versus accumulator content represents the calibration correction. If there is no offset, then it is verified that the log needs no calibration.

Reconstruction of a missing log involves obtaining data sets which contain a plurality of measurements for each depth level in a borehole but do not contain measurements representing a particular log. For example, the data set may contain only a neutron measurement and a bulk density measurement, but not a sonic measurement. A log of questionable quality may be considered to be a "missing" log. Reconstruction of the missing log (e.g., the sonic log) involves statistically combining these two-element data sets with the model of the field created on the basis of three element data sets (e.g., data sets containing neutron, bulk density and sonic measurement). To this end, each of the two-element data sets is used to address a row of cells in the three-dimensional memory storing the model. The row is along the dimension of the missing log. Each of the cells in that row corresponds to a three-element data set which has two elements that are identical to the elements of the corresponding two-element data set. The cells from the row are examined, and the cell which contains the highest count is chosen. The measurement for the missing log is then supplied by replacing the two-element data set with the three-element data set corresponding to the chosen cell.

The invented method is applicable to multidimensional data sets, such as data sets comprising, for example, four measurements, e.g., neutron, bulk density, sonic and resistivity measurements. It is applicable to other combinations of log measurements, preferably measurements which have some inherent mutual interdependence.

BRIEF DESCRIPTION OF THE DRAWINGS

FIG. 2 is a brief illustration of the major steps of an embodiment of the invention related to creating a statistical model of a field, as practiced on a general purpose digital computer.

FIG. 3 is a simplified illustration of a three-dimensional memory of cells for storing the statistical model of a field.

FIG. 5 is a schematic illustration of accumulators forming a part of the general purpose digital computer on which the invention is practiced.

FIG. 6 is an illustration of a specific use of the accumulators shown in FIG. 5.

DETAILED DESCRIPTION

Figure 1:
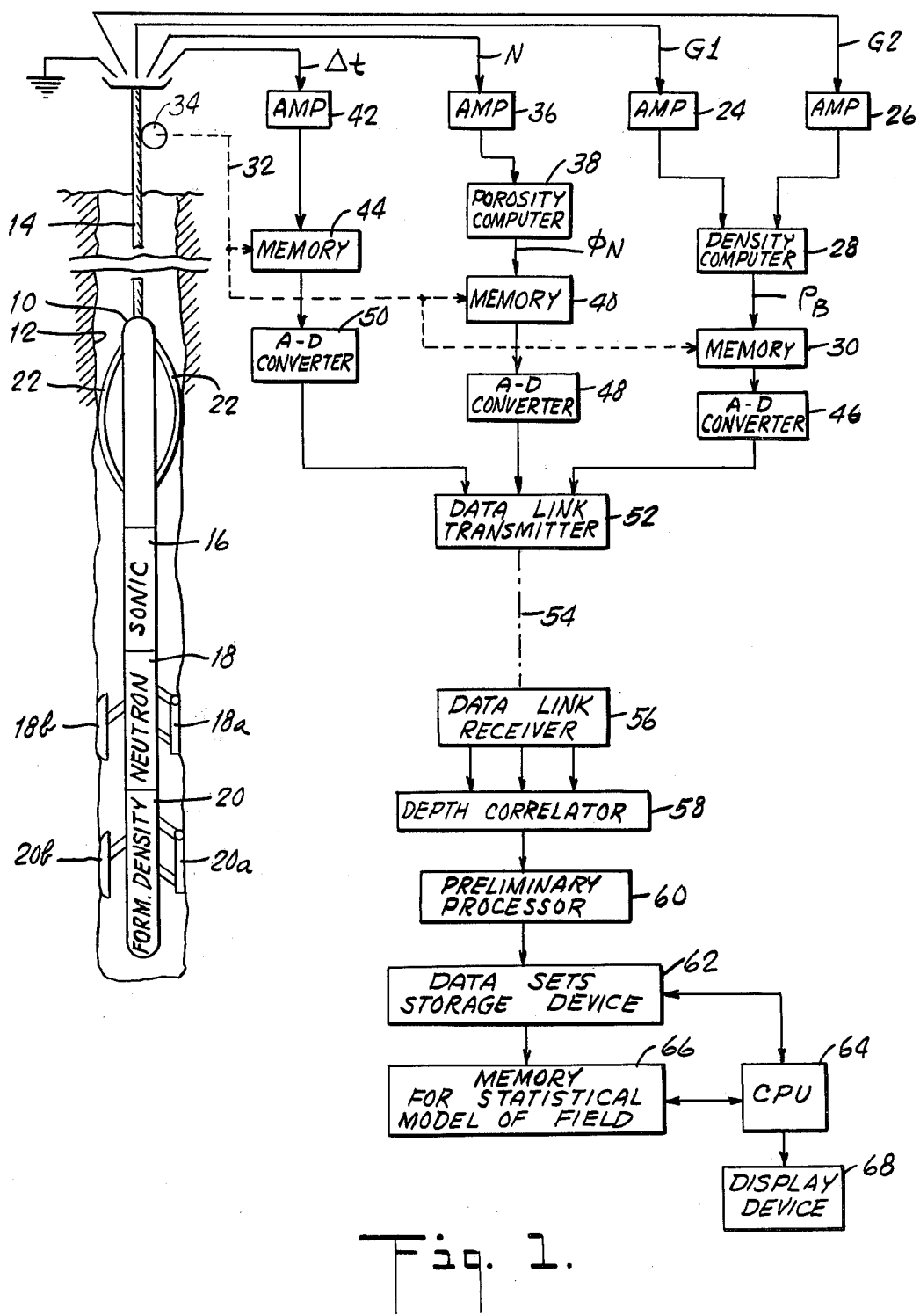
FIG. 1 is a schematic showing of investigating apparatus having a plurality of exploring devices for investigating adjacent earth formations, and a schematic showing of apparatus for recording well logging signals obtained from the exploring devices and for processing these signals for the purpose of creating a statistical model of a field, for the purpose of recalibrating logs on the basis of that statistical model and for the purpose of reconstructing missing logs on the basis of the model and in accordance with the subject invention.

The well logging data processed in accordance with the subject invention for the purpose of calibrating a log, or for the purpose of verifying the calibration of a log, or for the purpose of reconstructing a missing log, are derived by means of an apparatus of the type illustrated schematically in FIG. 1.

Referring to FIG. 1, a borehole investigating apparatus 10 is located in a borehole 12. The apparatus 10 is suspended into the borehole 12 at the lower end of an armored multiconductor cable 14 and is selectively raised and lowered in the borehole 12 by means of a suitable drum and winch mechanism (not shown) acting on the cable 14. The investigating apparatus 10 includes a suitable sonic exploring device 16 for measuring the acoustic travel time of the formation surrounding the borehole 12. Sonic exploring devices of this type are described in U.S. Pat. No. 2,938,592 granted to C. J. Charske et al. on May 31, 1960 and U.S. Pat. No. 3,231,041 granted to F. P. Kokesh on Jan. 25, 1966. The investigating apparatus 10 also includes a neutron exploring device 18 having a radiation source and a radiation detector mounted in a skid 18a for measuring the hydrogen contents of the earth formations adjoining the borehole 12, and thus the porosity of said formations. Exploring devices of this type are disclosed in U.S. Pat. No. 2,769,918 granted to C. W. Tittle on Nov. 6, 1956 and co-pending application Ser. No. 588,400 by H. Sherman and J. Tittman filed on Oct. 21, 1966. Alternatively, a conventional neutron exploring device can be used in place of the neutron device 18. In a conventional neutron device, neutrons emitted into a formation are captured by certain types of atoms in the formation, which results in the emission of high energy level gamma rays called capture gamma rays. The capture gamma rays are counted by a nearby detector. The investigating apparatus 10 also includes a formation density exploring device 20 for producing well logging measurements which can be utilized to calculate the bulk density of the adjoining formations. The formation density device 20 includes a skid 20a which houses a source and two detectors spaced at different distances from the source. This arrangement of a source and detectors produces signals which correspond to the bulk density of the earth formations adjoining the borehole 12. A formation density measuring device of this type is disclosed in an article by J. S. Wahl, J. Tittman, C. W. Johnstone and R. P. Alger entitled Dual Spacing Formation Density Log and published in the Journal of Petroleum Technology, Dec. 1964, pages 1411–1416; in an article by J. Tittman and J. S. Wahl entitled The Physical Foundations of Formation Density Logging (Gamma-Gamma) and published in Geophysics on Apr. 1965 at pages 284–294; and in U.S. Pat. No. 3,321,625 granted on May 23, 1967 to John S. Wahl. To keep the investigating apparatus 10 centered in the borehole, a pair of extendable wall engaging members 18b and 20b are provided opposite skids 18a and 20a respectively. A borehole caliper may be combined with the arms which extend the skid 18a and 20a to supply a signal representative of the diameter of the borehole 12. To keep the upper portion of the investigating apparatus 10 centered, a plurality of resilient spacers 22 are provided.

Still referring to FIG. 1, signals G1 and G2 are derived from the short and long spacing detectors of the formation density measuring device 20. These signals are in the form of pulses whose repetition rates are representative of the measured parameters. The count rate signals G1 and G2 are transmitted to the surface over respective conductors in the armored cable 14 and are amplified by a pair of amplifiers 24 and 26 respectively. The outputs of the amplifiers 24 and 26 are applied to a density computer 28 which computes the bulk density $\rho_B$ of the formations adjoining the borehole 12. If desired, the caliper signal can be applied to the density computer 28 to be used in the computation of the bulk density $\rho_B$. The resulting bulk density signal $\rho_B$ is supplied to a suitable memory 30 which stores the computed bulk density measurements in a manner which allows associating a stored measurement with the depth level in the borehole 12 at which this measurement is taken by the investigating apparatus 10. The memory 30 can be any suitable memory device such as a rotating magnetic or capacitor memory which stores for subsequent readout incoming signals for a sufficient depth interval. The memory 28 is driven at a speed which is a function of borehole depth by a shaft 32 coupled to a rotating wheel 34 which engages the armored cable 14 to thereby synchronize the memory 30 with the position of the investigating apparatus 10 relative to the depth of the borehole 12.

The neutron signal N derived by the neutron device 18 is in the form of a series of pulses proportional to the hydrogen content, and thus the porosity of the earth formations adjoining the borehole 12. This neutron signal N is supplied via a suitable conductor in the cable 14 to an amplifier 36 whose output is supplied to a suitable porosity computer 38 which converts the neutron count rate N to a DC signal proportional to the neutron derived porosity $\phi_N$. A device which can serve as the porosity computer 38 is disclosed in the abovementioned Sherman and Tittman copending application. The neutron derived porosity signal $\phi_N$ is supplied to a suitable memory 40 driven by the shaft 32. The memory 40 is similar to the memory 30 and acts to depth-synchronize the neutron derived porosity signal stored therein with the bulk density signal output from the density computer 28.

The travel time measurements $\Delta t$ derived from the sonic exploring device 16 are supplied via a suitable conductor in the armored cable 14 to an amplifier 42, and the amplifier output is supplied to a memory 44 which is similar to the memories 30 and 40 and is similarly synchronized by means of the shaft 32 in order to depth-synchronize the recorded sonic logging signals with the bulk density signals and the neutron derived porosity signals.

Either concurrently with recording in the memory 30, or at a subsequent time, the bulk density signals output from the density computer 38 can be supplied to an analog-to-digital converter 46 to be converted therein to digital signals suitable for transmission or for subsequent storage elsewhere. Similarly, the neutron derived porosity signals which are stored in the memory 40 may be supplied to a similar analog-to-digital converter 48, and the sonic signals recorded in the memory 44 may be supplied to a similar analog-to-digital converter 50. The digital signals provided at the outputs of the analog-to-digital converters 46, 48 and 50 are supplied to a data link transmitter 52 for transmission via a communication link 54 to a location for further processing of the measurements taken by the investigating apparatus 10.

For processing in accordance with the invented method, the digitized neutron sonic and density signals transmitted via the communications link 54 are received at a data link receiver 56 and may be supplied to a depth correlator 58, if desired, for fine depth correlation between the individual signals of a triple of measurement signals (neutron, sonic and density) derived at the same depth level in the borehole 12. The output of the depth correlator 58 may be supplied, if desired, to a preliminary processor 60 for carrying out any desired preliminary processing, such as preliminary zero shifting or preliminary scaling by a known factor. The output of the preliminary processor 60 is a series of triples of values called data sets. Each data set comprises a combination of the three measurements (neutron, sonic and density) taken at the same depth level in the borehole 12. For example, if measurements are taken every six inches as the investigating apparatus 10 is drawn up in the borehole 12, there is a data set comprising the three measurements taken at each six-inch interval along the borehole 12. The data sets output from the preliminary processor 60 are stored in a storage device 62 which may be a conventional drum, tape or disk storage device. Two or more boreholes 12 in the same field may be investigated as described above, and the data sets derived therefrom may be stored in the storage device 62. The data sets in the storage device 62 are processed under the control of a central processing unit 64 operating in accordance with the subject invention to generate from these data sets a statistical model of the field, and this statistical model is stored in a suitable memory 66. The memory 66 may be a conventional core memory, or a conventional disk or drum memory, or the like.

When a log from a given borehole 12 in the same field is to be calibrated, data sets which include that log and are stored in the storage device 62 are combined with the statistical model stored in the memory 66 in accordance with the subject invention in order to determine what zero shift, if any, may be required to bring that log into a defined statistical conformity with the model stored in the memory 66. The result of this determination may be displated on a display device 68 which may be a conventional computer printer. Under the control of the central processing unit 64 and in accordance with the subject invention, the zero shift may then be applied to the log of interest to calibrate the log on the basis of the determined zero shift.

Calibration of a log from a given field, or verifying the calibration of a log according to the subject invention involves two major steps: forming a statistical model of the field by means of combining, according to the invented method, a number of logs taken from boreholes in the same field; and combining the log which is to be calibrated with the statistical model according to the invented method to determine what modification thereof, if any, may be necessary to bring it into a defined statistical conformity with the model of the field. The invented method reflects the general principle that when an analyst is comparing logs to an a priori model of a field, and a small shift in one or several logs from the same field would cause them to conform to that a priori model, he would assume the shift to be legitimate and to correspond to a calibration error (zero or scale error). The analyst's basis for this assumption would be statistics from previous logs, plots, etc., as well as the extent of his knowledge and experience, and his subjective beliefs as to what the lithology of the field should be. The statistical model of a field which is created in accordance with the invented method reflects this general principle, but provides for applying it in situations in which it would be impossible or implausible for an analyst to process the available data about a field. Additionally, the invented method eliminates human error and eliminates subjectivity and personal bias.

To illustrate the problem to which the invented method is directed and to illustrate possible solutions to the problem, an example is given involving the three porosity logs. As will become clear below, the invented method is also applicable to other logs and to other combinations of logs, such as four or more logs, or two logs.

For the purposes of illustrating the principles of the invented method, suppose that there is a priori probability of finding a particular set of the three porosity measurements. In other words, for each triple of the porosity measurements in a three-dimensional space, there is a probability function.

$$P(\phi_N \cdot \rho_B \cdot \Delta t) = \frac{n(\phi_N \cdot \rho_B \cdot \Delta t)}{N}$$

where n is the number of occurrences of the particular triple, and N is the total number of triples. Then let us assume that a small calibration error in one of the logs tends to shift the triple which includes that log to a position of lower probability (the shift tendency is in statistical terms). For each triple of measurement derived at a given depth level from a new borehole in a field, there is a corresponding probability function, and the average probability per level can serve as a measure of the conformity between the triples of measurements from the new borehole and the a priori model defined by the a priori probability functions. Then, calibration can be carried out by maximizing the average probability through a systematic search around an original point.

The choice of an a priori probability is a critical step. It is doubtful that a universal probability function could be found for all logging conditions; even if such a universal probability function could be found, it would be a rather flat function and hence not very useful, since what is needed is a function with relatively steep variations in its domain. However, for a certain field, and even probably for a certain type of depositional environment, such a probability function should exist, and should possess the necessary properties for calibration purposes.

One method of creating a probability function is to select a set of logs run in reasonably good condition in a desired field (geologica environment) and to count the number of occurrences of each unique combination of the three porosity measurements. The accepted a priori probability for a triple of measurements would be the ratio of the corresponding number of occurrences to the total number of triples derived from the field. All mineral combinations normally expected in that field should preferably be included in the set of logs, but this is not an absolute requirement. Undetected small calibration errors in these logs may somewhat flatten the probability function, but should preserve its main properties. Additionally, small depth mismatches between logs would also somewhat average the function. The probability function can be progressively improved by merging new information deduced from new logs in the same field, preferably logs which are of excellent quality. A borehole including new minerals should not create problems provided that a large portion thereof corresponds to standard lithology.

The major steps in creating a statistical model of a field are illustrated in FIG. 2 in terms of steps suitable for execution on a general purpose digital computer programmed in accordance with the subject invention. The computer may comprise the central processing unit 64 shown in FIG. 1 together with the storage devices 62 and 66 and the display device 68. Although the invented method may be carried out on a small scale digital computer, by means of multiple transfers of data between bulk storage and fast memory, for the sake of simplicity, the invention is illustrated below as practiced on a large scale digital computer having a large fast (core) memory. One example of a suitable machine is an IBM System 360/65 general purpose digital computer which has conventional configuration and 512K bytes of core memory.

Referring to FIG. 2, the first step in building a statistical model of a field is to read at step 70 a data set which comprises a triple of the three porosity measurements taken at a given depth level in a borehole from the field which is of interest. The data set may be read from the storage device 62 in FIG. 1, or it may be otherwise formed. It is noted that the data set read at step 70 may comprise other measurements derived from apparatus for investigating earth formations traversed by a borehole.

The data set which is read at step 70 is examined at step 72 to determine if each of its measurements is within specified limits. A data set in which a measurement is abnormally removed from a reasonable range of values for a given field is probably erroneous and invalid and should not be allowed to influence undesirably a statistical model of that field; therefore, if the answer at step 72 is no, i.e., if the data set read at step 70 is not within defined limits, a return is made to step 70 to read another data set. The data set which was determined not to be within the defined limits at step 70 is thus completely discarded.

If the answer at step 72 is yes, i.e., if the data set read at step 70 is within the defined limits, control is transferred to step 74 to calculate a cell address corresponding to the particular combination of measurements comprising the data set read at step 70. The statistical model which is created in accordance with the invented method may be visualized functionally as a three-dimensional memory comprising a cube of cells, where each cell corresponds to a particular combination of the three porosity measurements. A schematic and abbreviated illustration of a three-dimensional memory of cells is shown in FIG. 3 where each of the cells is identified by a triple of numbers, each number ranging from 0 to 3. In the example shown in FIG. 3, the X dimension of the memory may be the neutron log measurement, the Y dimension of the memory may be the bulk density log measurement and the Z dimension may be the sonic log measurement. Thus, the cell labelled (0, 0, 0) corresponds to a data set in which each of the three porosity measurements is scaled to a zero, the cell labelled (1, 3, 1) corresponds to a data set in which the neutron measurement is scaled to 1, the bulk density measurement is scaled to 3 and the sonic measurement is scaled to 1. The label of a cell may be considered as its address. The cell labels may be given directly in units of the porosity measurements, of the cell addresses may be scaled as defined functions of the values of the porosity measurements of data sets.

Referring back to step 74 of FIG. 2, the three measurements of a data set are used to calculate the address of a cell in a cell memory of the type illustrated schematically in FIG. 3. After a cell address is calculated, control is transferred to step 76 to increment the current contents of the addressed cells. All cells in the memory may initially contain zero or some other known arbitrary number. If all cells in the memory contain zeros at the start of the steps shown in FIG. 2, and the address of a cell is calculated for the first time, the contents of that cell are incremented from zero to one to indicate that there occurred a data set corresponding to that cell. Each time a cell address is calculated at step 74, its contents are incremented by one.

After step 76, a test is made at step 78 to determine if there are any remaining data sets. If there are remaining data sets, a return is made to step 70 to read another data set; if there are no remaining data sets, a distribution listing is printed at step 80 by the display device 68 (FIG. 1) to show the distribution of the cell contents of the memory illustrated in FIG. 3. In the typical case, most of the memory cells have not been addressed and hence contain no counts. Typically, only up to a few thousand memory cells contain counts.

It is noted that the three-dimensional memory illustrated in FIG. 3 need not in fact be a three-dimensional matrix of cells, but may be simulated on a two-dimensional memory such as the fast (core) memory 66 in FIG. 1. What is important is only that the memory 66 (FIG. 1) has sufficient capacity to have as many word locations as there are cells in the three-dimensional memory discussed above. The required number of word locations is the number of possible unique data sets whose measurements are within the limits defined in step 72 (FIG. 2). For example, if there are 50 possible values for each of the three porosity measurements, the memory 66 must have at least 125,000 word locations (i.e., 50×50×50), each word location (cell) corresponding to a unique data set.

Figure 4:
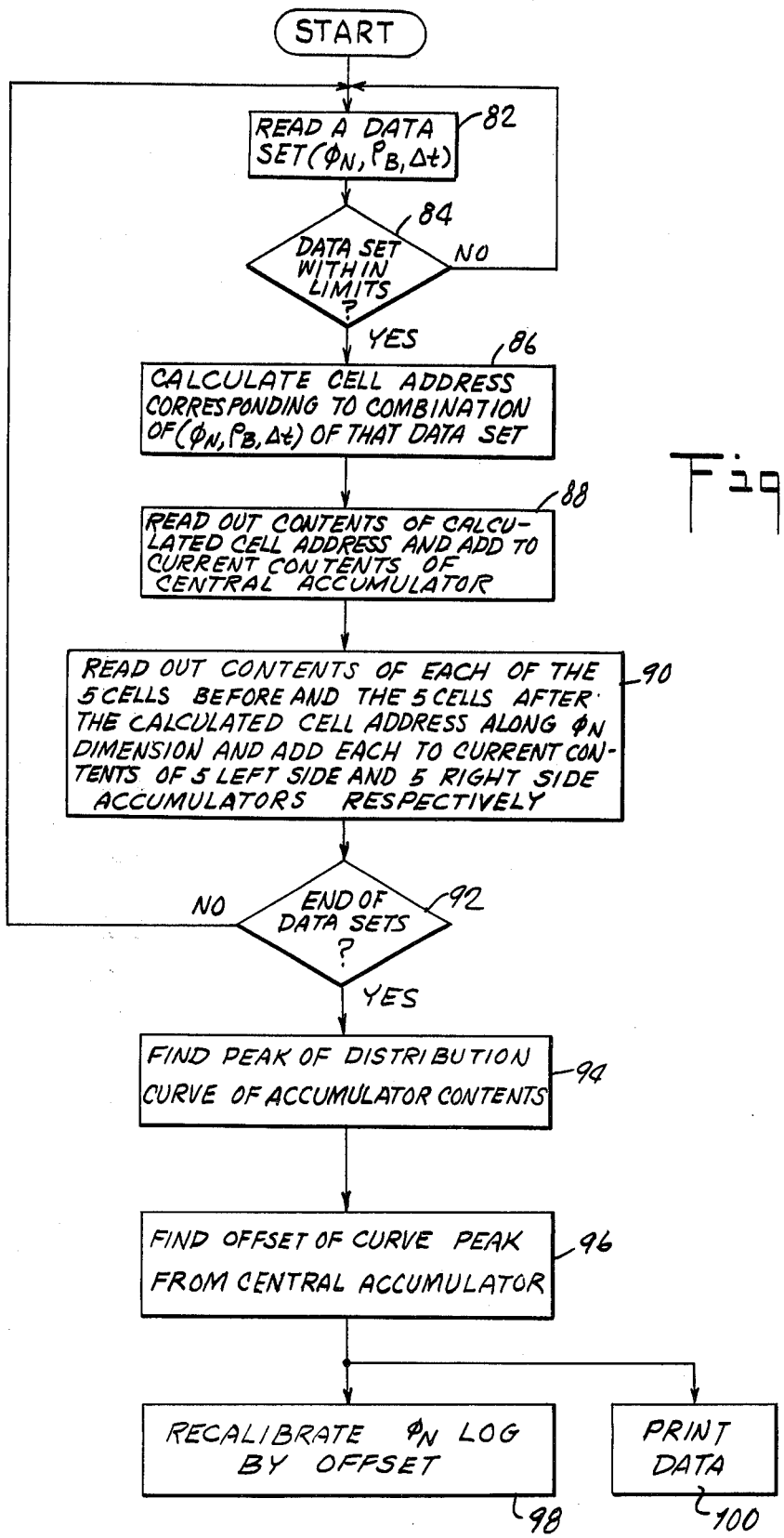
FIG. 4 is an illustration of the major steps of an embodiment of the invention which is concerned with recalibrating a log, as practiced on a general purpose digital computer.

After processing data obtained from one or more boreholes in a given field by means of the method illustrated in FIG. 2, the memory 66 contains information which represents a statistical model of the field. This statistical model may be used to calibrate a log obtained from a borehole in the same field, or to verify the calibration of a log, by means of the process whose major steps are illustrated in FIG. 4. The calibration and calibration verification process involves statistically combining data sets from a borehole in that field with the statistical model in the memory 66 to determine what modification, if any, of a selected measurement in each of these data sets may be required to bring the selected measurements into a defined statistical conformity with the model.

Referring to FIG. 4, steps 82, 84 and 86 are the same as steps 70, 72 and 74 respectively of FIG. 2, except that the data sets referred to in FIG. 4 contain a measurement representing a log whose calibration is questioned. For example, if may be desired to calibrate or to verify the calibration of the neutron log from a given borehole, and each of the data sets which are processed in steps 82, 84 and 86 contains a neutron measurement representing that log.

In particular, at step 82, a data set is read from the storage device 62 (FIG. 1), and if the data set is not discarded at step 84 because of failure to fall within defined limits, it is used at step 86 to calculate a cell address in the same manner as a data set is used at step 74 of FIG. 2 to calculate a cell address.

At step 88 of FIG. 4, the contents of the cell whose address is calculated at step 86 are nondestructively read out of the cell and are added to the current contents of an accumulator called a "central" accumulator. The central accumulator may be a register, or simply a location in memory in which a running sum is kept of the contents of the cells whose addresses are calculated at step 86.

At step 90, the contents of the several adjacent cells along the dimension of the log which is to be calibrated (e.g., the neutron log dimension) are read out, and each is added to the current contents of a corresponding accumulator from a plurality of accumulators called "side" accumulators.

FIG. 5 illustrates a central accumulator 100, a right-side accumulator 102 which is labelled the "(+1)" accumulator, another right-side accumulator 104 labelled the "(+2)" accumulator, a left-side accumulator 106 labelled "(−1)", and a second left-side accumulator 108 labelled "(−2)". The central accumulator 100 stores cumulatively the contents of the cell whose address is calculated at step 86, the right-side accumulator 102 stores the contents of the immediately adjacent cell in the positive direction along the dimension corresponding to the log which is to be calibrated, and the rightside accumulator 104 stores the contents of the cell immediately adjacent along the same direction to the cell whose contents are stored cumulatively in the side accumulator 102. The left-side accumulator 106 stores cumulatively the cell immediately preceding (in the direction of the log which is to be calibrated) the cell whose contents are stored in the central accumulator 100, and the left-side accumulator 108 stores cumulatively the contents of the cell immediately preceding (in the direction of the log which is to be calibrated) the cell whose contents are stored in the left-side accumulator 106. There may be additional left-side and right-side accumulators arranged in a similar manner and serving a similar function. In fact, one specific embodiment of the invention uses five left-side and five right-side accumulators.

FIG. 6 illustrates a specific example which is described below by reference to FIGS. 3, 4 and 5. In this specific example, suppose that the cell labelled (2, 3, 1) in FIG. 3 is the cell whose address is calculated at step 86 in FIG. 4. The contents of that cell are stored in the central accumulator 100. Then, the contents of the immediately adjacent cell along the dimension of the log which is to be calibrated (i.e., along the $\phi_N$ dimension) are read out and stored in the right-side accumulator 102. This cell is the cell labelled (3, 3, 1) which is immediately to the right side of the cell (2, 3, 1) in FIG. 3. If there are other cells to the right of the cell labelled (2, 3, 1) in FIG. 3, their contents are stored cumulatively in other respective right-side accumulators. The contents of the cell labelled (1, 3, 1) which cell is immediately preceding the cell (2, 3, 1) in FIG. 3, are added cumulatively to the current contents of the left-side accumulator 106. The contents of the next preceding cell, i.e., the cell labelled (0, 3, 1) in FIG. 3 are added cumulatively to the side accumulator 108, etc.

When the next data set is used at step 86 of FIG. 4 to calculate a cell address, suppose that this new cell address identifies the cell labelled (2, 1, 0) in FIG. 3. Then the cell whose contents are added cumulatively to the side accumulator 102 is the cell labelled (3, 1, 0); the cell whose contents are added cumulatively to the side accumulator 106 is the cell labelled (1, 1, 0); and the cell whose contents are added to the current contents of the side accumulator 108 is the cell (0, 1, 0), etc.

Figure 7:
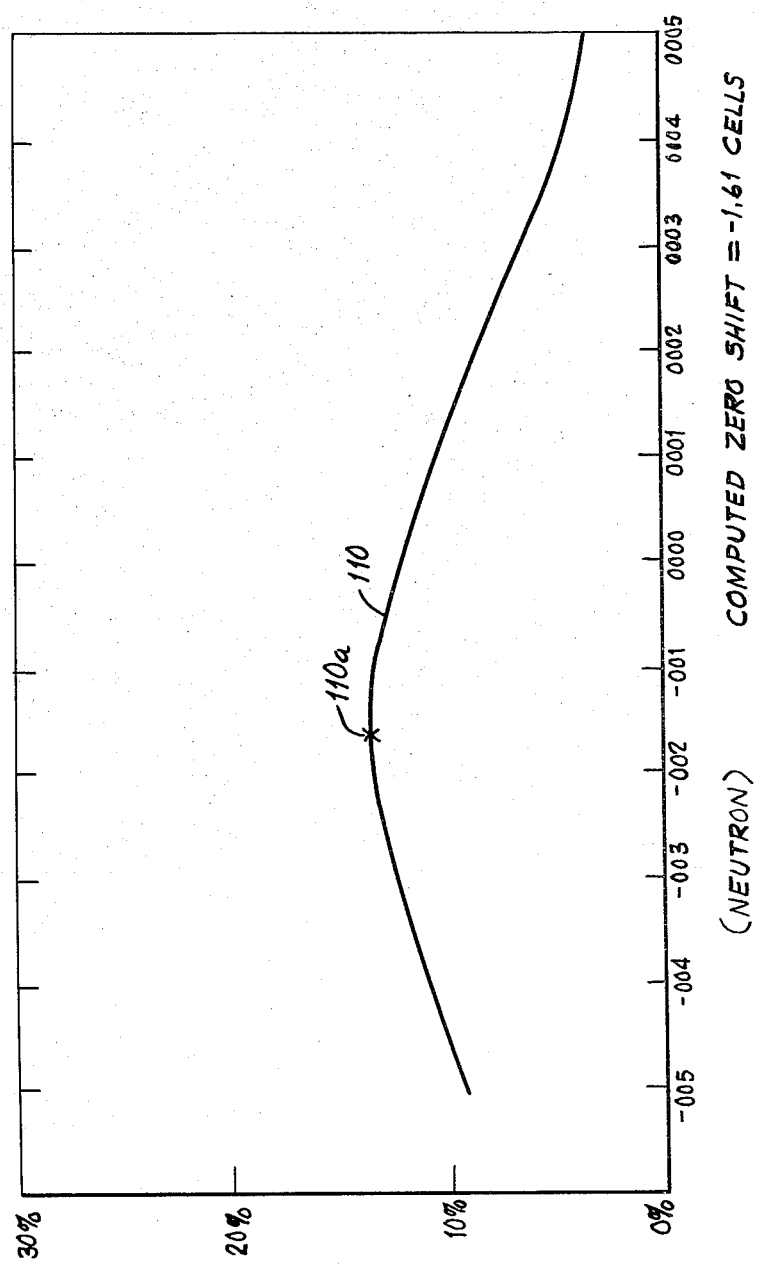
FIG. 7 shows a plot formed through carrying out the steps of the embodiment of the invention shown in FIG. 4 on a general purpose digital computer.

Referring back to FIG. 4, after all of the data sets containing a measurement for the log which is to be calibrated have been processed through step 90, the test at step 92 indicates that there are no more such data sets. At that time, the accumulators contain cumulative counts, and at step 94 a distribution curve is formed of the contents of these accumulators. The distribution curve is a plot of the accumulator contents versus the distance from the central accumulator. An exemplary distribution curve is illustrated in FIG. 7 where the horizontal axis is the accumulator number and the vertical axis is the accumulator contents (actually, the percentage of the counts in an accumulator of the total number of counts in all accumulators). The central accumulator 100 of FIG. 5 is labelled 0000 in FIG. 4, the left-side accumulator 106 is labelled −001, the left-side accumulator 108 is labelled −002, etc., the right-side accumulator 102 is labelled 0001 in FIG. 7, the right-side accumulator 104 is labelled 0002, etc. The line labelled "probability" in FIG. 7 lists in numbers located above the corresponding accumulator the percentage of the count in that accumulator of the total counts in all accumulators, and the line above that, which is labelled "accumulative cell count", lists the actual counts stored in the respective accumulators.

A curve 110 may be fitted by conventional curve fitting techniques to the plot represented by the percentage count in FIG. 7. According to the subject invention, the peak of that curve 110 which is labelled 110a in FIG. 7 is a measure of the zero shift which must be applied to the log tested for calibration in order to bring that log into the defined statistical conformity with the statistical model of the field which is formed in accordance with the subject invention and is stored in the memory 66. In the illustrative example of FIG. 7, the peak of the curve 110 is displaced to the left of the central accumulator 100 by 1.61 cell units. This means that a zero shift in neutron porosity units corresponding to 1.61 cell units must be subtracted from each porosity measurement of the log which was tested for recalibration to bring that log into the defined statistical conformity with the model. Referring back to FIG. 4, the peak of the curve 110 is found at step 94, the offset of the curve peak from the central accumulator is found at step 96, and the neutron log is calibrated by the determined offset at step 98. At step 100 a print, such as the plot shown in FIG. 7 may be provided.

The above discussion gave the specific example of calibrating a neutron log. Similar calibration may be carried out for the bulk density log or for the sonic log. In calibrating the bulk density log for example, a cell address is calculated in a similar manner at step 86 of FIG. 4, and at step 88 the several adjacent cells whose contents are read out and added to the current contents of respective accumulators are along the bulk density dimension of the three-dimensional memory shown in FIG. 3. Referring to FIG. 5, if the cell whose contents are added to the central accumulator 100 is the cell labelled (2, 2, 0), then the cell whose contents are added to the side accumulator 102 is the cell labelled (2, 3, 0); the cell whose contents are added to the side accumulator 106 is the cell labelled (2, 1,0), etc. Similarly, when calibrating a sonic log, if the cell whose address is calculated at step 86 in FIG. 4 is the cell labelled (1, 3, 1), then the cell whose contents are added to the side accumulator 102 in FIG. 5 is the cell labelled (1, 3, 2), and the cell whose contents are added to the side accumulator 106 is the cell labelled (1, 3, 0), etc.

Figure 8:
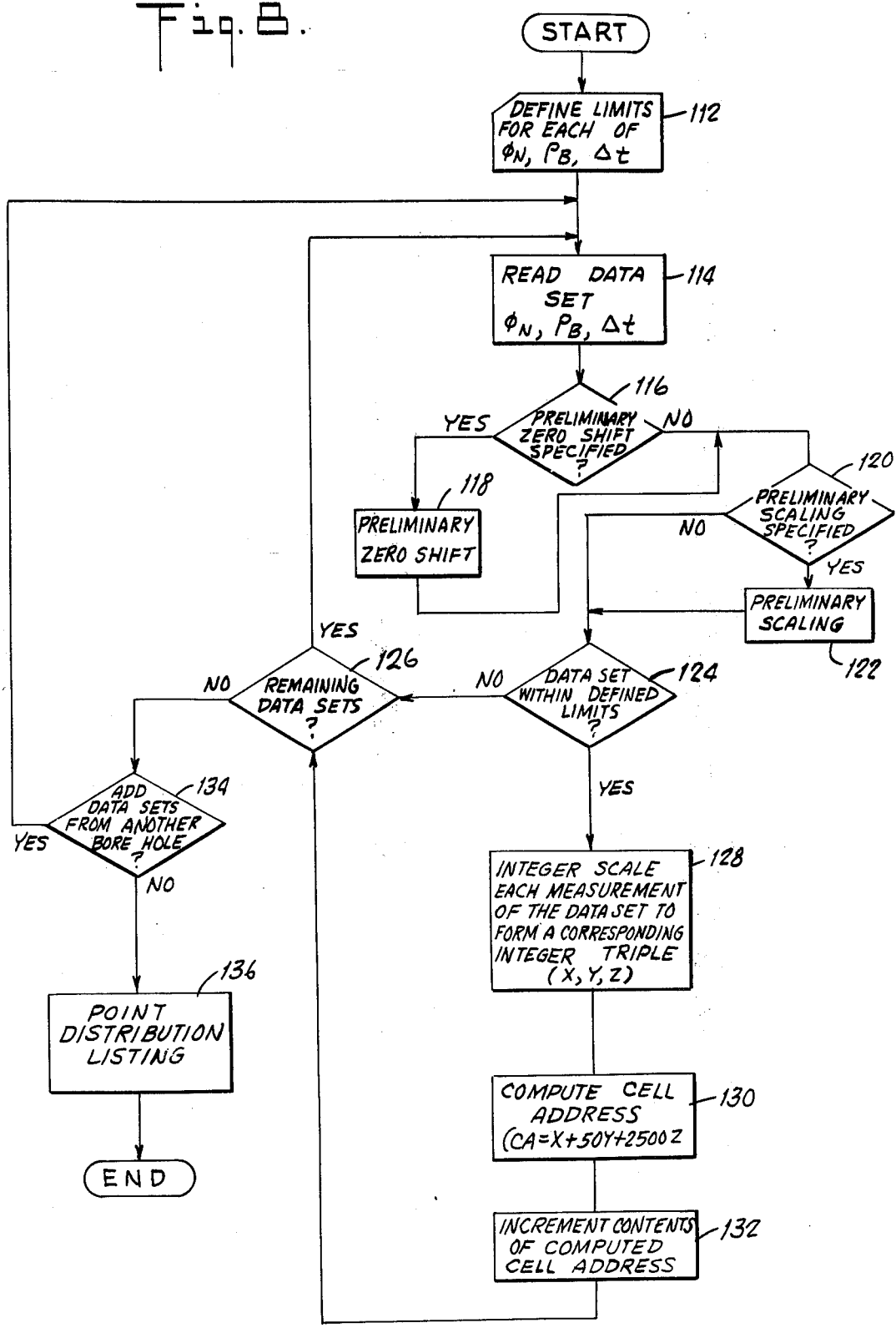
FIG. 8 is a detailed showing of an embodiment of the invention concerned with creating a statistical model of a field, said embodiment practiced on a general purpose digital computer.

A specific embodiment of that portion of the invented method which deals with creating a statistical model of a field is shown in detail in FIG. 8. The method shown in FIG. 8 is carried out on a suitable general purpose digital computer, such as an IBM System 360/65 of conventional configuration and with enough core memory, for example 512K bytes of core memory. Each of the steps discussed in connection with FIG. 8 is representable in corresponding statements in a high level computer language, such as FORTRAN IV (see for example, Cress, P. H. et al., FORTRAN IV with WAT-FOR, University of Waterloo, 1968; see also, Ledley, R. S., Programming and Utilizing Digital Computers, McGraw-Hill 1962, and Maurer, W. D., Programming, Holden-Day, 1968). A program written in FORTRAN IV statements corresponding to each of the steps of FIG. 8 is compiled by means of a conventional FORTRAN compiler into machine language suitable for execution on the computer to carry out the disclosed embodiments of the subject invention.

Prior to executing the method illustrated in FIG. 8, one or more boreholes in a field are investigated by equipment of the type shown in FIG. 1, and data sets of the type discussed above are stored in the storage device 62. Although data sets from a single borehole in the field may be sufficient in some situations, it is preferable to have data sets from several boreholes, for example, at least three or four boreholes. It is preferable to obtain reasonably reliable data sets, e.g., it is desirable to either manually check the calibration of each of the logs obtained from the boreholes or to otherwise ensure that the logs are reasonably well calibrated.

Referring to FIG. 8, limits are defined for the values of each of the three porosity logs at step 112. As discussed earlier, this is for the purpose of eliminating obviously erroneous measurements, and to preven such obviously erroneous measurements from degrading the expected statistical model of the field. For example, it may be known about a specific field that the neutron log measurement should be in the range of −0.10 to +0.40 neutron porosity log units, that the bulk density measurements should be in the range of 1 to 3.5 bulk density units, and that the sonic measurements should be within the range of 50 to 150 sonic units. These limits may be defined at step 112, such that any data set which contains a measurement outside the respective limit will be dropped.

At step 114, a data set is read from the storage device 62 (FIG. 1) and at step 116 a test is made to determine if a preliminary zero shift has been specified. Such preliminary zero shift may be desired because it is known that a particular log has been shifted by a known amount. For example, it may be known that the instruments involved in recording the neutron log have consistently introduced a zero offset of +0.05 neutron log units. If that is the case, then it is specified that each neutron measurement should be shifted in the corresponding direction by 0.05 units. Then, the test at step 116 is positive and control is transferred to step 118 for the purpose of correspondingly offsetting each of the neutron measurements. If no preliminary zero shift has been specified, control is transferred to step 120 where a test is made to determine if a preliminary scaling has been specified. Preliminary scaling is similar to the preliminary zero shift and may be desired for similar reasons; the only difference is that scaling involves multiplication by a defined factor rather than algebraic addition of a defined offset. If a preliminary scaling has been specified, it is carried out at step 122. Specific methods for carrying out such preliminary zero shifting and scaling are conventional in the well logging art.

If no preliminary zero shift and no preliminary scaling have been specified, or after preliminary zero shift or preliminary scaling, control is transferred to step 124 where a test is made to determine if the data set (after any preliminary zero shift or preliminary scaling) is within the limits defined at step 112. If the data set is not within the defined limits, control is transferred to step 126 where a test is made to determine if any data sets remain. If data set remain, control is returned to step 114 to read the next sequential data set from the storage device 62 (FIG. 1).

If the data set tested at step 124 is within the limits defined at step 112, control is transferred to step 128 where each of the measurements comprising the data set is integer-scaled to form thereby an integer triple (X,Y,Z) which corresponds uniquely to the data set. For example, each of the three measurements of a data set may be given the integer range between 0 and 49, and each integer may be uniquely associated with a specified range of log units. Thus, if the data sets contain neutron measurements in the range of −0.10 to +0.40 neutron log porosity units as discussed above, the integer 0 is associated with a neutron measurement of −0.10 units, the integer 1 is associated with a neutron measurement of −0.09 units, the integer 2 is associated with −0.08 neutron units, etc. Similarly, if the bulk density range is from 1.00 to 3.50 bulk density units, the integer 0 is associated with a bulk density measurement of 1.00 unit, the integer 1 is associated with a bulk density measurement of 1.05 units, the integer 2 is associated with a bulk density measurement of 1.10 units, etc. In the same manner, if the sonic measurements range between 50 L and 150 sonic log units, the integer 0 is associated with sonic measurements of 50 and 51 units, the integer 1 is associated with sonic measurements of 52 and 53 units, the integer 2 is associated with sonic measurements of 54 and 55 sonic units, etc. After step 128, each data set is represented as a corresponding integer triple (X,Y,Z) wherein each of the elements of the triple is within the integer range of 0 to 49. For example, the data set (−0.10, 1, 50) corresponds to the integer triple (0, 0, 0); the data set (−0.05, 3, 100) corresponds to the integer triple (5, 40, 25); and the data set (+0.40, 3.5, 149) corresponds to the integer triple (49, 49, 49).

At step 130, the integer triple formed at step 128 is used to compute a cell address corresponding to the data set from which the integer triple is formed. For example, if each of the elements of the integer triples ranges from 0 to 49, 125,000 cell addresses are needed to provide a cell address for each unique integer triple (i.e., 50×50+50 cell addresses). If the memory 66 in FIG. 1 (e.g., the core memory of a general purpose digital computer) has at least 125K word locations numbered linearly and sequentially from 0 to 124,999, then a cell address CA (word address) may be calculated by the following expression:

$$CA = X + 50Y + 2500Z$$

Thus, the integer triple (0, 0, 0) would result in the cell identified by the linear address 0, the integer triple (1, 1, 0) would result in the linear cell address 51, the integer triple (1, 1, 1) would result in the linear cell address 2551.

At step 132, the current contents of the cell identified by the address computed at step 130 are incremented by 1.

After step 132, control is returned to step 126 to determine if any data sets for the same borehole remain in the memory 62 (FIG. 1). If data sets reamin, control is returned to step 114 to read the next sequential data set and to proceed to the following steps. If the answer to the test at step 126 is no, i.e., if all the data sets for a given borehole have been exhausted, control is transferred to step 134 to determine if additional data sets derived from another borehole in the same field are to be added. If the answer is yes, control is returned to step 114 to start reading data sets derived from that borehole. If the answer at step 134 is no, control is transferred to step 136 to print a distribution listing and to end the steps. The distribution listing is a printout of the number of times each integer occurs in the contents of the cells. An example of a distribution list is given in Table 1 below where the column labelled "Class" lists the integers which can be found in the cells of the memory, the column labelled "Frequency of Occurrences" lists the number of cells which contain the integer, and the next two columns to the right bear self-explanatory labels.

TABLE 1

| Class (C) | Freq. of Occurrences (F) | Freq. List. (C × F) | Cumulative Frequency |
|---|---|---|---|
| 0 | 121430 | 0 | 0 |
| 1 | 1953 | 1953 | 1953 |
| 2 | 780 | 1560 | 3513 |
| 3 | 413 | 1239 | 4752 |
| 4 | 281 | 1124 | 5876 |
| 5 | 205 | 1025 | 6901 |
| 6 | 133 | 793 | 7699 |
| 7 | 106 | 742 | 8441 |
| 8 | 82 | 656 | 9097 |
| 9 | 79 | 711 | 9808 |
| 10 | 46 | 460 | 10268 |
| 11 | 45 | 495 | 10763 |
| 12 | 46 | 552 | 11315 |
| 13 | 27 | 351 | 11666 |
| 14 | 24 | 336 | 12002 |
| 15 | 19 | 285 | 12287 |
| 16 | 17 | 272 | 12550 |
| 17 | 11 | 187 | 12746 |
| 18 | 12 | 216 | 12962 |
| 19 | 8 | 152 | 13114 |
| 20 | 10 | 200 | 13314 |
| 21 | 3 | 63 | 13377 |
| 22 | 2 | 44 | 13421 |
| 23 | 6 | 138 | 13559 |
| 24 | 3 | 72 | 13631 |
| 25 | 2 | 60 | 13681 |
| 26 | 5 | 130 | 13311 |
| 27 | 1 | 27 | 13838 |
| 28 | 1 | 28 | 13366 |
| 29 | 3 | 87 | 13953 |
| 31 | 1 | 31 | 13984 |
| 32 | 1 | 32 | 14016 |
| 33 | 1 | 33 | 14049 |
| 34 | 1 | 34 | 14063 |
| 36 | 2 | 72 | 14155 |
| 41 | 1 | 41 | 14196 |

Figure 9:
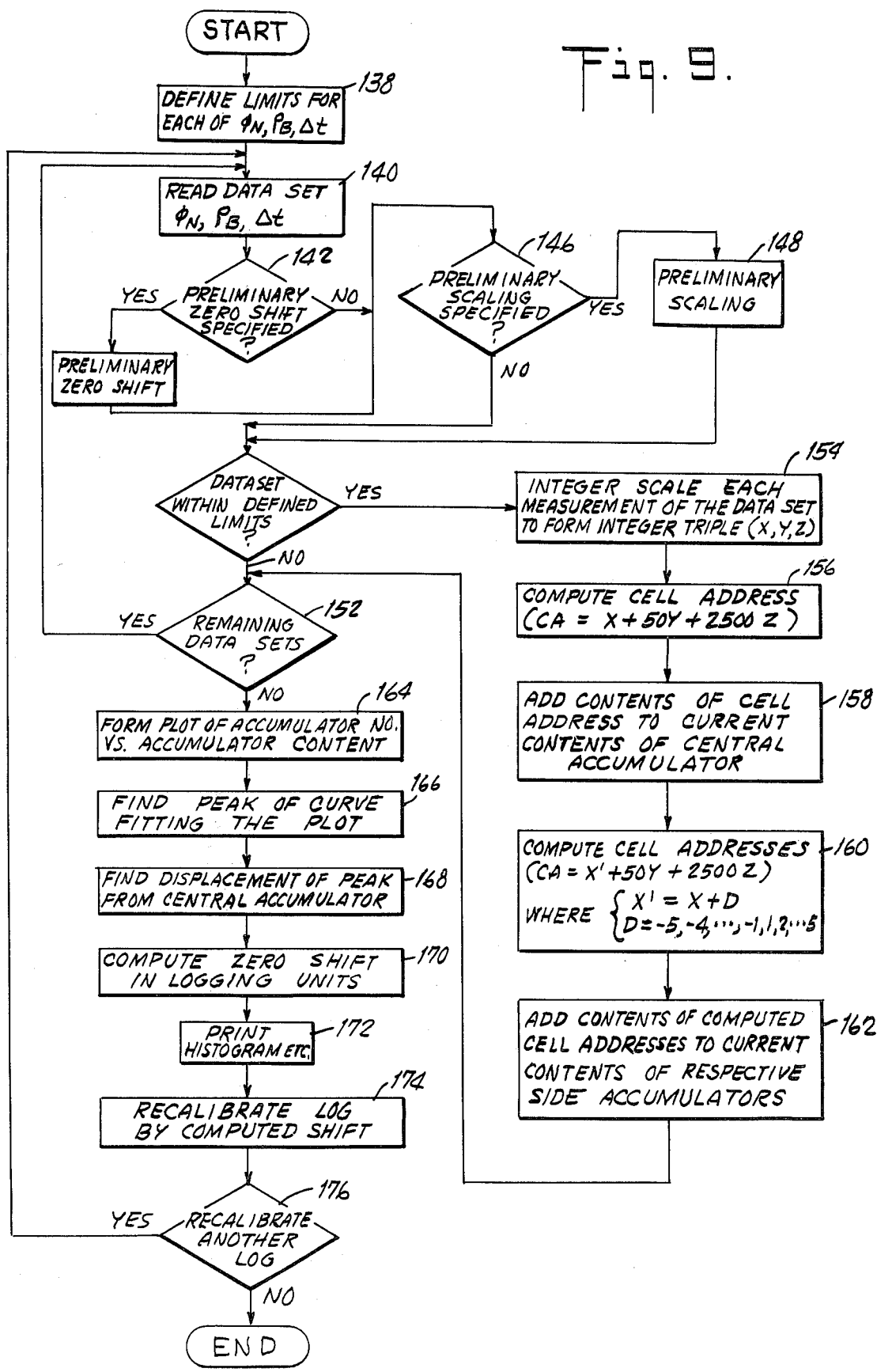
FIG. 9 is a detailed showing of an embodiment of the invention concerned with recalibrating a log, said embodiment practiced on a general purpose digital computer.

A detailed embodiment of the portion of the subject invention concerned with calibration of a log or with verifying the calibration of a log is illustrated in FIG. 9. In FIG. 9, the first ten steps correspond to the first ten steps of FIG. 8. In particular steps 138, 140, 142, 144, 146, 148, 150, 152, 154 and 156 of FIG. 9 correspond respectively to steps 112, 114, 116, 118, 120, 122, 124, 126, 128, and 130 of FIG. 8. The only difference is that the data sets processed in FIG. 9 contain a measurement representing a log which is to be calibrated. For simplicity of illustration, it is assumed that the neutron log measurements are to be calibrated, but it should be clear that alternatively, the bulk density measurements or the sonic measurements may be recalibrated.

After step 156 in FIG. 9, control is transferred to step 158 where the contents of the cell whose address is computed at step 156 are added to the current contents of a central accumulator. The central accumulator may be one of the general registers of the digital computer on which the invention is practiced, or it may be simply a location in memory which serves as an accumulator.

At step 160, ten additional cell addresses are calculated according to the expression $$CA = X' + 50Y + 2500Z$$

$$\text{where} \begin{cases} X' = X + D \\ D = -5, -4, \ldots, -1, 1, 2, \ldots, 5 \end{cases}$$

For example, if the address calculated at step 156 is 20, the ten addresses calculated at step 160 are, respectively: 15, 16, 17, 18, 19, 21, 22, 23, 24 and 25.

At step 162, the contents of the cell addresses computed at step 160 are added to the current contents of respective side accumulators. For example, if there is a central accumulator and ten side accumulators labelled as discussed in connection with FIG. 7, the contents of cell 15 are added to the current contents of the accumulator −005, the contents of cell 16 are added to the current contents of the accumulator −004, the contents of cell address 21 are added to the current contents of the accumulator 0001, the contents of cell address 22 are added to the current contents of accumulator 0002, etc.

After step 160, control is returned to step 152 to determine if there are remaining data sets for the same borehole. If the answer is yes, control is returned to step 140 to read another data set, and to proceed again through step 162. If there are no remaining data sets, control is transferred to step 164 to form a plot of accumulator number versus accumulator content, i.e., a plot of the type illustrated in FIG. 7.

At step 166, the peak of a curve fitting the plot is found, as discussed in connection with FIG. 7, and at step 168 the displacement of the curve peak from the central accumulator is found in terms of cell units, again is discussed in connection with FIG. 7. In the example given in FIG. 7, the curve peak is displaced from the central accumulator by −1.61 cell units.

At step 170, the necessary zero shift is computed in terms of logging units by carrying out the reverse of step 154. In this example, one cell unit corresponds to 0.01 neutron log units, and −1.61 cell units corresponds to an offset of −0.0161 neutron log porosity units.

After step 170, control is transferred to step 172 where a printout is provided of a histogram showing the plot formed at step 164 and the values computed at steps 168 and 170.

As an optional procedure, the particular log (i.e., the neutron log) may be calibrated by adding algebraically to each measurement representing that log the zero shift computed in neutron log units at step 170. In this example, calibration is carried out by subtracting from the $\phi_N$ measurement in each data set.

After step 172, or after the optional step 174, control is transferred to step 176 where a test is made to determine if another log is to be calibrated. If the answer is yes, control is returned to step 140 to read from the storage device 62 (FIG. 1) the first data set that includes another log which is to be calibrated. If the answer to the test made at step 176 is no, the calibration and calibration verification procedure shown in FIG. 9 is ended.

The procedure shown in FIG. 9 can be used for any of the three measurements forming a data set. For example, if the bulk density log is to be recalibrated, the cell addresses computed at step 160 are computed according to the following expression:

$$CA = X + 50Y' + 2500Z$$

where $\begin{cases} Y' = Y + D \\ D = -5, -4, \ldots, -1, 1, 2, \ldots, 5 \end{cases}$ Thus, in the case of recalibrating the bulk density log, if, for example, the cell address computed at step 156 is 300 (resulting from an integer triple 0, 6, 0), then the ten addresses calculated at step 160 are, respectively: 50, 100, 150, 200, 250, 350, 400, 450, 500 and 550. Similar modification is made when recalibrating the sonic log by the procedure illustrated in FIG. 9.

Figure 10:
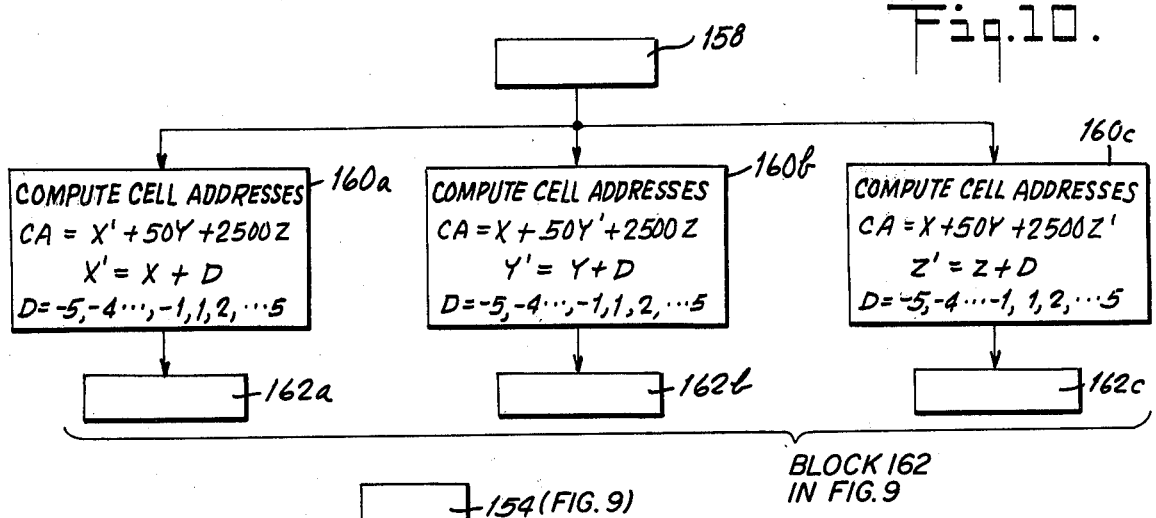
FIG. 10 shows a modification of the embodiment shown in FIG. 9, said modification serving for concurrent recalibration of three logs.

When it is desired to calibrate more than one of the three logs which form the data sets, the method illustrated in FIG. 9 may be modified to the extent illustrated in FIG. 10. In particular, if it is desired to calibrate or to verify the calibration of each of the neutron, bulk density and sonic logs, then the method illustrated in FIG. 9 is followed through step 158 thereof, and then instead of executing step 160 illustrated in FIG. 9, the steps 160a, 160b and 160c of FIG. 10 are executed either simultaneously or sequentially.

Step 160a of FIG. 10 corresponds exactly to step 160 of FIG. 9. Step 160b of FIG. 10 is for calibrating the bulk density log and involves computing the addresses of the cells adjacent the cell whose address is computed at step 156, with the adjacent cells being along the dimension of the bulk density log. Step 160c is for calibrating the sonic log and involves computing the addresses of the cells adjacent the cell whose address is computed at step 156, but along the dimension corresponding to the sonic log. Then, in addition to the ten side accumulators discussed in connection with step 162 of FIG. 9, there are two additional and different sets of ten accumulators for storing the contents of the cells whose addresses are computed at step 160b and 160c respectively. Additionally, step 164 of FIG. 9 is modified to the extent of providing plots of accumulator number versus accumulator content for each of the three sets of eleven accumulators each resulting from the execution of steps 158, 160a, 160b and 160c. Steps 166, 168, 170, 172, and 174 of FIG. 9 are modified to the extent of treating each of the curves resulting from the execution of steps 160a, 160b and 160c in the same manner as the curve resulting from the execution of step 160 of FIG. 9.

An important aspect of the subject invention is that it is applicable to data sets which may have more than three dimensions, i.e., data sets which may comprise more than three different measurements. For example, the methods disclosed herein may be applied to a data set comprising a neutron measurement, a bulk density measurement, a sonic measurement, and another measurement, such as a resistivity measurement. In such case, the statistical model is four-dimensional. One manner of embodying the four-dimensional statistical model in a two-dimensional core memory is to compute cell addresses according to an expression of the form $$CA = X + aY + bZ + cR$$

where a, b and c are integer constants and X, Y, Z and R are integer-scaled measurements representing, for example, a neutron, a bulk density, sonic, and a resistivity measurement respectively. If each of the measurements is integer scaled to the range of 0 to 24, the four-dimensional statistical model requires 390,625 cell locations. If a byte of memory is assigned per cell location, then a general purpose digital computer with 512K bytes of core memory is sufficient. If a two-byte word is assigned per cell location, then a 1,024K byte core memory is sufficient.

Figure 11:
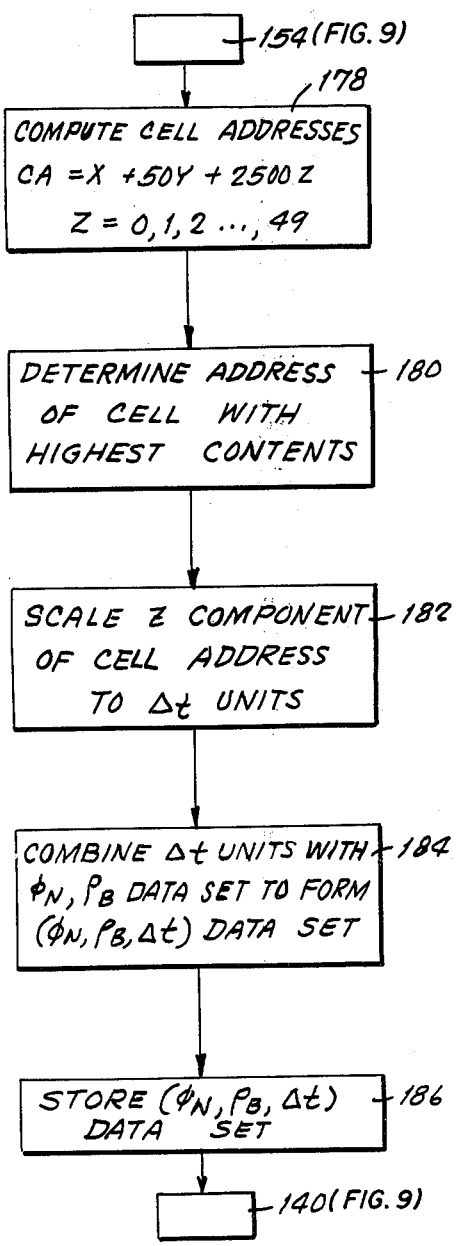
FIG. 11 is a showing of an embodiment of the invention concerned with reconstructing a missing log by modifying certain steps of FIG. 9, said embodiment practiced on a general purpose digital computer.

There are situations where certain logs from a given borehole may be available and may be in good condition, but a particular log taken in the same borehole may be either in poor condition or nonexistent. The subject invention provides a method for reconstructing a missing or poor log with the help of other logs from the same borehole and with the help of the statistical model of the field in which the borehole is located. A specific embodiment of a method for reconstructing a missing or poor log is shown in FIG. 11. Prior to proceeding with the method of FIG. 11, it is assumed that a statistical model of the field has been created as discussed in connection with FIG. 8, and that at least two logs are available from a specific borehole for which a log is missing. For example, let us assume that a neutron and a bulk density log are available for a given borehole, but that the sonic log for that borehole is missing. To reconstruct the missing log, data sets are formed as discussed in connection with FIG. 9, except that the data sets have only two elements each, namely, a neutron measurement and a bulk density measurement. Then, the steps involved in the reconstruction of a missing log are the same as steps 138 through 154 of FIG. 9, the only difference being that the data sets used in the reconstruction of a missing log have only two elements as opposed to the three elements of the data sets used in the method shown in FIG. 9.

After step 154, the data sets used in reconstructing a missing log are integer pairs; in the example given here each data set is scaled to an integer pair (X,Y) Referring to FIG. 11, the integer pair is used at step 178 to compute cell addresses according to the expression $$CA = X + 50Y + 2500Z$$

where $Z = 0, 1, 2, \ldots, 49$

The computation at step 178 results in 50 cell addresses. In effect, if the statistical model is visualized as contained in a three dimensional cell cube, the 50 cell addresses are a row along the dimension of the missing log.

At step 180 of FIG. 11, the contents of the 50 cells whose addresses are computed at step 178 are examined to determine which cell contains the highest count. If two or more of the cells contain the same counts, it is immaterial which of them is chosen.

After a cell address is determined at step 180, the third element of the cell address (this third element is an integer ranging from 0 to 49) is scaled back to sonic measurement units. The number in sonic measurement units obtained at step 182 is combined at step 184 with the other two elements of the data set read at step 140 to form a three-element data set ($\phi_N$, $\rho_B$, $\Delta t$). This three-element data set is stored at step 186 in a suitable location in memory, and a return is made to step 140 to read another two-element data set.

After the method discussed above has been repeated for all of the two-element data sets from a given borehole, the result is a plurality of three-element data sets, where the third elements of each of these data sets are a representation of the missing log.

I claim:

1. A method of machine processing the outputs of borehole investigating devices passed through borehole sections to take respective measurements of the surrounding earth formation comprising:

deriving at least three logs of the borehole sections from the outputs of said investigating devices, said logs being different from each other but being functionally related to the same earth formation characteristic, each log comprising a respective borehole measurement of the earth formation at each of a succession of borehole depths, and forming from said logs, for each given one of said succession of borehole depths, a respective set of borehole measurements, each set comprising a borehole measurement from each of said logs;

providing a number of different combinations of values, each combination comprising values equal in number to the number of said logs;

producing an occurrence representation related to said first selected borehole section by finding, for each of said combinations of values, the occurrence of similarly valued sets among the sets of said borehole measurements which are from the logs taken at a first selected borehole section;

combining the sets of said sets of borehole measurements which are from the logs taken at a second selected borehole section with said occurrence representation related to the first selected borehole section to produce a calibration correction indicative of a desired correction for the portion of one of the logs taken at said second selected borehole section, and utilizing said calibration correction to convert the last selected log portion into an improved, calibrated log portion consistent with said occurrence representation.

2. A method as in claim 1 in which the step of producing said occurrence representation includes providing a functionally multidimensional cell memory in which each dimension corresponds to a respective one of said logs and each cell corresponds to a respective defined combination of the measurements which make up a set of borehole measurements, and storing in each cell a value related to the found occurrence, among said sets of borehole measurements which are from the logs taken at the first borehole section, of sets valued similarly to the defined combination of measurements corresponding to that cell, and the step of combining to produce said calibration correction includes providing a central accumulator and a selected number of side accumulators which are functionally in a row preceding and a row following the central accumulator and, for each set of borehole measurements which are from the logs taken at the second borehole section, finding the cell which corresponds to a combination of measurements valued similarly to that set and cumulatively storing the contents of the found cell in the central accumulator, and cumulatively storing, in the respective side accumulators of the row preceding the central accumulator, the contents of the respective cells which precede the found cell along the dimension of a selected one of said logs and cumulatively storing, in the respective side accumulators which follow the central accumulator, the contents of the respective cells which follow the found cell along the same dimension, wherein the final distribution of values among the central and side accumulators is indicative of said calibration correction.

3. A method as in claim 2 in which the step of utilizing the calibration correction includes converting the portion of the selected log which is taken at the second borehole section to a calibrated log portion by correcting each borehole measurement from said log portion by an amount depending on said calibration correction to thereby produce a sequence of corrected measurements making up said corrected log portion.

4. A method as in claim 2 in which the step of producing said occurrence representation includes providing a cell memory in which the cells along any dimension follow each other in integer steps which extend over respective selected ranges, and scaling the measurements of said sets of borehole measurements to integer values consistent with said ranges of integer steps of the cell memory.

5. A method of machine processing the outputs of borehole investigating devices passed through borehole sections to take respective measurements of the surrounding earth formation comprising:
deriving, from the outputs of said investigating devices, at least two logs of a first and of a second borehole section and an additional log of the first borehole section, said logs being different from each other but being functionally related to the same earth formation characteristic, each log comprising a respective borehole measurement of the earth formation at each of a succession of borehole depths, and forming from said logs, for each given one of said succession of borehole depths, a respective set of borehole measurements, each set of measurements which are from logs taken at the first borehole section comprising a borehole measurement from each of said at least two logs and a borehole measurement from said additional log, and each set of measurements which are from logs taken at said second borehole section comprising a measurement from each of said at least two logs but missing a measurement from said additional log;
providing a number of different combinations of values, each combination comprising values equal in number to the number of borehole measurements which make up a set of measurements from the logs taken at said first borehole section;
producing an occurrence representation related to said first selected borehole section by finding, for each of said combinations of values, the occurrence of similarly valued sets among the sets of said borehole measurements which are from the logs taken at the first selected borehole section;
combining the sets of said sets of borehole measurements which are from the logs taken at the second selected borehole section with said occurrence representation related to the first selected borehole section to reconstruct the respective missing measurements of the sets of borehole measurements which are from the logs taken at the second borehole section, said reconstructed measurements forming a reconstructed additional log, of said second borehole section, which is consistent with said occurrence representation of the first borehole section.

6. A method as in claim 5 in which
the step of producing said occurrence representation includes providing a functionally multidimensional cell memory in which each dimension corresponds to a respective one of said logs taken at the first borehole section and each cell corresponds to a respective defined combination of the measurements which make up a set of borehole measurements taken at the first borehole section, and storing in each cell a value related to the found occurrence, among the sets of borehole measurements which are from logs taken at the first borehole section, of sets valued similarly to the defined combination of measurements corresponding to that cell, and the step of combining the sets of borehole measurements which are from the logs taken at the second selected borehole section with said occurrence representation to reconstruct the respective missing measurements of the sets of borehole measurements which are from the logs taken at the second borehole section includes finding, for each given set of borehole measurements which does not include said additional measurement, a number of cells in the cell memory which are similarly valued when the additional measurement thereof is disregarded, and reconstructing the missing measurement of the given set by augmenting the given set with the additional measurement of that cell of the last recited number of cells which contains a value indicative of the highest occurrence of similarly valued sets among the sets of said borehole measurements which are from the logs taken at the first borehole section.

7. A method as in claim 6 in which the step of producing said occurrence representation includes providing a cell memory in which the cells along any dimension follow each other in uniform, integer steps which extend over respective selected ranges, and scaling the measurements of said sets of borehole measurements to integer values consistent with said ranges of the cell memory.

8. A method of machine processing the outputs of borehole investigating devices passed through borehole sections to take respective measurements of the surrounding earth formation comprising:
deriving at least three logs of the borehole sections from the outputs of said investigating devices, said logs being different from each other but being functionally related to the same earth formation characteristic, each log comprising a respective borehole measurement of the earth formation at each of a succession of borehole depths, and forming from said logs, for each given one of said succession of borehole depths, a respective set of borehole measurements, each set comprising a borehole measurement from each of said logs;
providing a number of different combinations of values, each combination comprising values equal in number to the number of said logs;
producing an occurrence representation related to said first selected borehole section by finding, for each of said combinations of values, the occurrence of similarly valued sets among the sets of said borehole measurements which are from the logs taken at a first selected borehole section;
combining the sets of said sets of borehole measurements which are from the logs taken at a second selected borehole section with said occurrence representation related to the first selected borehole section and producing, based on the result of said combining, a graphic representation of a calibration correction indicative of a calibration correction, for the portion of a selected one of the logs taken at said second selected borehole section, conforming said log portion to said occurrence representation of said first borehole section.

9. A method as in claim 8 in which
the step of producing an occurrence representation includes providing a functionally multidimensional cell memory in which each dimension corresponds to a respective one of said at least three logs and each cell corresponds to a respective one of said different combinations of values, and storing in the respective cells values related to the occurrence of similarly valued sets among the sets of said borehole measurements which are from the logs taken at the first borehole section, and the step of combining sets of borehole measurements which are from the logs taken at the second borehole section with said occurrence representation and producing said graphic representation of a correction comprises finding, for each given one of the sets of borehole measurements which are from the logs taken at the second borehole section, the cell corresponding to a similarly valued combination of values and producing respective cumulative graphic representations of the contents of the found cell and the contents of a selected number of cells adjacent thereto which are along the dimension corresponding to said selected log, said graphic representations being an indication of a calibration correction conforming said log portion to said occurrence representation of the first borehole section.

10. A method as in claim 9 in which the step of providing said cell memory includes providing cells which are spaced from each other along each of the respective dimensions in uniform integer intervals and including scaling the sets of borehole measurements to integer values consistent with the cell memory prior to said producing an occurrence representation and said combining to produce said graphic representations.

11. A machine implemented log calibration method in which at least three logs functionally related to the same earth formation characteristic are derived from the outputs of borehole investigating devices passed through borehole sections to take respective measurements of the surrounding earth formation comprising:

deriving, from said at least three logs, a respective set of borehole measurements for each respective one of a succession of borehole depths, each set including a respective measurement from each of said logs;

providing a functionally multi-dimensional cell memory where each dimension corresponds to a different one of said logs and each cell corresponds to a defined different combination of the measurements comprising a set of borehole measurements;

storing, in each respective one of said cells, a value related to the occurrence of the defined combination of measurements corresponding to that cell among the sets of borehole measurements which are for borehole depths corresponding to a first selected borehole section to thereby provide, by means of the contents of said cells, an occurrence representation of the earth formation adjacent said first borehole section;

providing a central accumulator and a selected number of side accumulators which are functionally in a row preceding and a row following the central accumulator and, for each given set of borehole measurements for depths corresponding to a second borehole section: (i) cumulatively storing in the central accumulator the contents of the memory cell found to correspond to the combination of measurements which make up the given set of borehole measurements, (ii) cumulatively storing, in the respective side accumulators preceding the central accumulator, the respective contents of the several cells which precede said found cell along the dimension of a selected one of said logs and (iii) cumulatively storing, in the respective side accumulators following the central accumulator, the respective contents of the several cells which follow said found cell along the same dimension; wherein the final distribution of contents of said central and side accumulators is indicative of a calibration correction, for the portion of the selected log which is taken at said second borehole section, making said log portion consistent with the occurrence representation of said first borehole section.

12. A method as in claim 11 wherein the steps of providing a cell memory and storing values therein comprise providing a memory in which the cells along each respective dimension correspond to a defined combination varying uniformly in the selected dimension in integer intervals, and including scaling the sets of borehole measurements to integer levels consistent with the integer intervals of the cell memory prior to storing values in said cells and prior to storing contents of cells in said central and side accumulators.

13. A method as in claim 11 including converting said log portion to a corrected log portion consistent with said occurrence representation of the first borehole section on the basis of said calibration correction.

14. A method of producing a log of the variation of a given formation characteristic with depth in a given borehole comprising the steps of:

deriving, for each of a number of different depth levels in the given borehole, a respective set of measurements of parameters which are different from each other and from said given formation characteristic;

deriving, for each of a number of different depth levels in each of a number of other boreholes in the same earth formation, a respective set of measurements of said parameters, and for each of the last recited sets, a value for said given formation characteristic;

producing, from said sets derived for said other boreholes and said values for the given formation characteristic, an occurrence map indicative of the number of occurrences, to a given tolerance, of each particular combination of the measurements making up a set and the value for the given formation characteristic for that set;

combining each respective set of measurements for the given borehole with said occurrence map to find the most frequently occurring combination which includes a set valued similarly to the last recited respective set of measurements, and associating that combination's value for the given formation characteristic with the respective set of measurements for the given borehole; and producing a tangible representation of a log of the variation of the given formation characteristic with depth in the given borehole from said values for the given formation characteristic associated with sets of measurements for the given borehole in the immediately preceding step.

* * * * *